Patented Nov. 25, 1924.

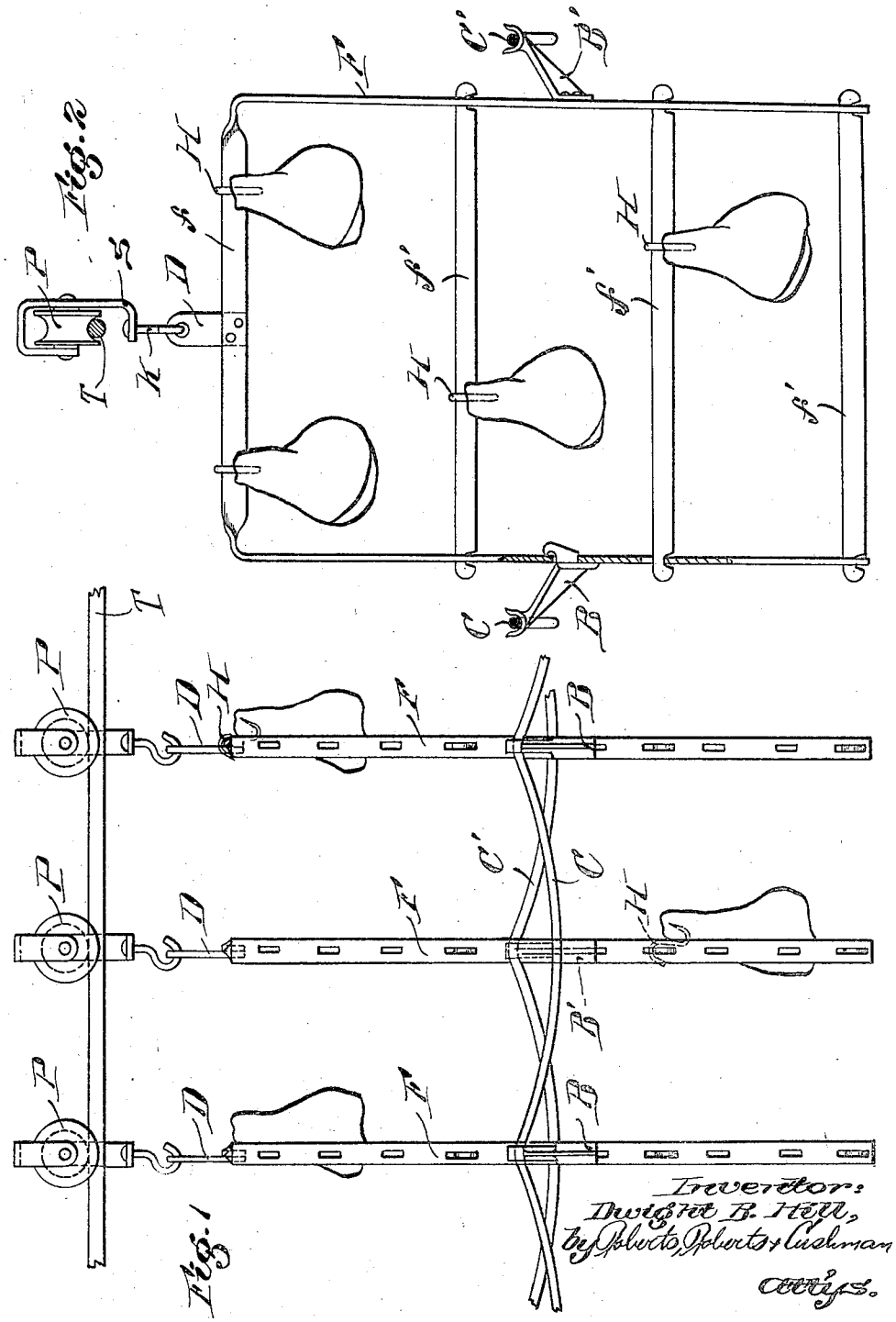

1,516,728

UNITED STATES PATENT OFFICE.

DWIGHT BRADFORD HILL, OF WINCHESTER, MASSACHUSETTS.

MEAT-CURING METHOD AND APPARATUS.

Application filed April 24, 1923. Serial No. 634,263.

*To all whom it may concern:*

Be it known that I, DWIGHT BRADFORD HILL, a citizen of the United States of America, and resident of Winchester, in the county of Middlesex and State of Massachusetts, have invented new and useful Improvements in Meat-Curing Methods and Apparatus, of which the following is a specification.

This invention is particularly intended for use in curing pork, beef and fish but may be used in treating other products. Objects of the invention are to hasten the penetration of the meats or other products by smoke or other treating agents, to harden the surface of meats to restrain their drying tendency, to smoke meat without a preliminary drying process as for example immediately after it is taken out of pickle instead of after an intermediate drying process which causes loss of weight and quality, to give meat an effect known as the "varnish effect" (a hardening and glossing effect) in a single treatment, for example, in the smoking treatment, thereby eliminating the additional warming treatment, which usually takes upwardly of six hours, followed by a special "varnish treatment", and to cure meats quicker and better than is possible with methods heretofore known.

A cardinal feature of the invention consists in subjecting the meat or the like to a high-frequency electric field, i. e., a field having a frequency of pulsation or alternation far above the frequency of the usual alternating currents, e. g., a frequency of at least approximately one hundred thousand cycles per second and preferably a frequency of the order of a million cycles per second or more. Such a field causes smoke adequately to penetrate the meat in a short interval of time and by slightly prolonging the application of the field the surface of the meat may be hardened to produce the so-called "varnish effect" in the same operation, instead of in a subsequent operation after an intermediate warming as has been done heretofore. In curing pork for example, the meat, when subjected to a high-frequency field can be smoked and "varnished" in a single treatment of approximately one-half hour duration, thereby eliminating the over-night warming and subsequent "varnish treatment" which has heretofore been required after smoking. Meat so treated has superior firmness and color throughout, and its surface has superior quality of appearance and capacity to restrain subsequent drying of the meat. With this process the meat may be treated immediately after removal from the pickling solution without an intermediate drying stage, thereby further reducing interior drying and consequent shrinkage.

It may be either the electrostatic component or the magnetic component of the electric field or both which produces the characteristic effects of high-frequency fields but it is probably the electrostatic component.

The invention also involves a unique way of applying the electric field by means of the frames upon which the meat is hung or otherwise supported. Each of these frames may comprise a rectangular framework fabricated of metal bars or tubular rods upon which the pieces of meat are hung in superposed rows one or both sides of the frame in electrical contact with the frame. The frames are hung on a conveyor or otherwise supported in rows with the frames spaced along the rows and alternate frames are charged oppositely to produce the electric fields throughout the spaces between the frames. In this way electrostatic electrodes are eliminated, the meat and frames serving this purpose. Moreover, by supporting the frames so as to extend transversely of the rows in approximate parallelism the fields are distributed more uniformly throughout the spaces occupied by the meat with the meat in the more intense sections of the fields adjacent the frames which serve as the electrodes; and by insulating the frames from the conveyor and from the walls of the smoking room the intensity of the electrification of the meat is still further enhanced.

In practice it is desirable to load the frames outside the smoke room and move the loaded frames into the smoke room on a conveyor, preferably an overhead track. To this end means are provided for quickly and easily connecting alternate frames (i. e. every other frame or frames at other recurrent intervals) to a field producing source.

For the purpose of illustration, one form of apparatus for practicing the invention is shown in the accompanying drawings in which:

Fig. 1 is a side view of a row of meat frames supported on an overhead conveyor; and Fig. 2 is a view at right angles to that shown in Fig. 1.

The particular embodiment of the invention chosen for the purpose of illustration comprises series of meat frames F supported on a trolley T with alternate frames connected to conductors C and C' through brackets B and B'. The frames F comprise vertical side bars integrally connected together at the top by cross bars *f* which are twisted at 90° adjacent the upright side bars. Other cross bars *f'* are detachably hooked into slots in the upright side bars and the meat is hung on the cross bars *f* and *f'* by means of metallic hooks H. The frames F are supported on the trolley T by means of pulleys P which are connected to the frame through straps S, hooks K and connectors D. To insulate the frames from the trolley the connectors D may be formed of insulation material.

The brackets B and B' may be connected either permanently or detachably to the frame F; thus in Fig. 2 the right-hand brackets B' are shown as being riveted to the frame and the left-hand brackets B are shown as detachably hooking in slots in the frame F. The conductor C is supported on alternate frames by engagement with the brackets B and the conductor C' is supported on the intermediate frames by engagement with the brackets B'. When using detachable brackets such as shown at B the conductor may be fastened to the brackets, in which case the brackets are detached from the frames to remove the conductor from the frames.

In operation the frames are ordinarily loaded at one location and then moved over the trolley system to another location, such as a smoke room, before the conductors C and C' are connected with the frames. After the frames have been placed in a row, as shown in Fig. 1, in the desired location, the conductors C and C' are applied to the frames as shown in the drawings and the current is supplied to the frames through these conductors.

For the purpose of smoking the meat, the operation is carried on in a closed room, the smoke being supplied to the room in any suitable way as by means of fires on the floor or in suitable receptacles. After the operation is completed the conductors are removed from the frames and the frames are then moved on the conveyor system to the desired location as for example to the packing room.

Instead of using two cables alternate frames may be conductively supported on the conveyor in which case the conveyor serves as one side of the circuit in lieu of one cable and one set of brackets (e. g. the left-hand detachable brackets, Fig. 2) is eliminated.

Among the more important advantages of the high-frequency current treatment herein disclosed over treatment with unidirectional or ordinary alternating current are the following: The rate of penetration of the smoke is not only greatly increased but the penetration is more uniform throughout each piece of meat. The varnish effect is not only produced in the same operation as the smoking and in much less time but a markedly superior finish is produced; the hardened surface layer is thinner (thick enough to retain the juice but not thick enough appreciably to dull the knives of slicing machines) and the gloss is brighter.

The hereindescribed method of electrifying the meat is simple and easy to manipulate, it can readily be applied to existing plants, a large quantity of meat can be treated in a comparatively small room, and all the pieces throughout the room are uniformly treated.

I claim:

1. The method of treating meat which comprises subjecting the meat to a high-frequency electric field to harden the surface of the meat.

2. The method of treating meat which comprises subjecting the meat to a curing agent and concomitantly producing a high-frequency electric field in the region of the meat.

3. The method of treating meat which comprises subjecting the meat to a curing agent and concomitantly producing in the region of the meat an alternating electric field having a frequency sufficiently high to harden the surface of the meat.

4. The method of treating meat which comprises subjecting the meat to a curing agent and concomitantly producing an electric field in the region of the meat with current having a frequency of at least approximately one hundred thousand cycles per second.

5. The method of treating meat which comprises subjecting the meat to a curing agent, hastening the penetration of the meat by the curing agent with a high-frequency electric field, and prolonging the electric field to harden the surface of the meat.

6. The method of treating meat which comprises subjecting the meat to a curing agent, and concomitantly subjecting the meat to an alternating electric field whose frequency is sufficiently high to cause rapid penetration of the meat by the curing agent and then to harden the surface of the meat in a single treatment of short duration.

7. The method of treating meat which comprises supporting pieces of meat on frames spaced from each other in a row and charging alternate frames oppositely with high-frequency current to produce high-frequency electric fields across the spaces between the frames.

8. The method of treating meat which comprises supporting pieces of meat on frames spaced from each other in a row and charging alternate frames oppositely to produce electric fields throughout the spaces between the frames.

9. Meat curing apparatus comprising a row of spaced frames, and means for connecting alternate frames to opposite sides of an electric circuit, thereby to set up electric fields in the spaces between the frames.

10. Meat curing apparatus comprising a row of spaced frames, means for supporting the frames in insulated relationship from each other, and means for connecting alternate frames to opposite sides of an electric circuit, thereby to set up electric fields in the spaces between the frames.

11. Meat curing apparatus comprising a row of spaced frames, certain frames having conductor supports out of alignment with other of the frames, and a conductor detachably supported on said supports out of contact with the other frames.

12. Meat curing apparatus comprising a row of spaced frames, alternate frames having conductor supports out of alignment with each other longitudinally of said row, and conductors detachably supported on the supports of alternate frames respectively.

13. Meat curing apparatus comprising a row of spaced frames, recurrent frames having conductor supports extending laterally of the row and intermediate frames having conductor supports extending laterally of the row out of alignment with the first supports.

14. Meat curing apparatus comprising a row of spaced frames, conductor supports extending laterally of the row from recurrent frames.

15. Meat curing apparatus comprising a meat frame having a conductor support extending laterally therefrom.

16. A meat frame comprising a skeleton framework disposed substantially in a plane and a conductor support extending from the framework substantially in the same plane.

17. Meat curing apparatus comprising a row of frames extending transversely of the row in spaced relationship, and means extending outwardly from the margins of the frames for connecting alternate frames to opposite sides of an electric circuit, thereby to set up electric fields in the spaces between the frames.

18. Meat curing apparatus comprising a conveyor, a series of meat frames mounted in a row on said conveyor, a conductor extending along said row in electrical connection with recurrent frames, and means insulating said recurrent frame from other frames of the row.

19. Meat curing apparatus of the type having a series of meat frames mounted in spaced relationship on a conveyor characterized by a high-potential conductor extending along the series of frames and means for detachably supporting the conductor on recurrent frames out of conducting relationship with intermediate frames.

20. Meat curing apparatus of the type having a series of meat frames mounted in spaced relationship on a conveyer characterized by two high-potential conductors extending along the series of frames and means for detachably supporting the conductors on alternate frames respectively.

21. Meat curing apparatus comprising a conveyer, a series of meat frames mounted on the conveyer, a conductor extending along said series of frames in spaced relationship to certain of the frames, and connectors on other of the frames connecting with said conductor.

22. Meat curing apparatus comprising a conveyer, a series of meat frames mounted on the conveyer, a conductor extending along said series of frames in spaced relationship to certain of the frames, and supports on other of the frames for said conductor.

23. Meat curing apparatus comprising a conveyer, a series of meat frames mounted on the conveyer, and means for electrifying the meat on said frames, said means being in electrical contact with recurrent frames of said series.

24. Meat curing apparatus comprising means for supporting a series of meat frames in insulated relationship from each other, and electrical means in conducting relationship with recurrent frames for electrifying the meat on the frames.

25. The method of treating meat which comprises supporting pieces of meat on frames spaced from each other in a row and producing regions of opposite polarity alternately along the row to electrify the meat on the frames, recurrent frames conducting the electricity to the meat thereon.

26. The method of treating meat which comprises supporting pieces of meat on frames spaced from each other in a row and producing regions of opposite polarity along the row to electrify the meat on the frames, the frames conducting the electricity to the meat thereon.

27. The method which comprises supporting pieces of meat in adjacent rows and oppositely electrifying recurrent rows of the meat.

28. The method which comprises supporting pieces of meat in adjacent rows and oppositely electrifying alternate rows with high frequency current.

29. The method which comprises supporting pieces of meat in adjacent planes with the pieces distributed in two dimensions in each plane and electrifying the meat with current of opposite polarity simultaneously applied to the meat in recurrent planes.

30. The method which comprises supporting pieces of meat in adjacent planes with the pieces distributed in two dimensions in each plane and electrifying the meat with a source of high frequency current opposite sides of which are respectively connected to the pieces in alternate planes.

31. Meat curing apparatus comprising a conveyor, a series of meat frames on the conveyer in insulated relationship from each other, detachable supporting means for supporting pieces of meat on the frames in spaced relationship, and conductors extending along said series of frames for connecting alternate frames to opposite sides of an electric circuit to produce high-frequency electric fields between the frames.

Signed by me at Boston, Massachusetts, this fifth day of April, 1923.

DWIGHT BRADFORD HILL.